(12) United States Patent
King et al.

(10) Patent No.: US 7,907,266 B1
(45) Date of Patent: Mar. 15, 2011

(54) RADIOMETER FOR DETECTING AND MEASURING LOW LEVELS OF PULSED LASER SOURCES

(75) Inventors: Daniel Wayne King, Riverside, CA (US); Rodney William Leonhardt, Boulder, CO (US)

(73) Assignees: The United States of America as represented by the Secretary of the Department of Commerce, Washington, DC (US); The United States of America as represented by the Secretary of the Navy, Washington, DC (US)

( * ) Notice: Subject to any disclaimer, the term of this patent is extended or adjusted under 35 U.S.C. 154(b) by 130 days.

(21) Appl. No.: 12/468,804

(22) Filed: May 19, 2009

(51) Int. Cl.
*G01J 1/00* (2006.01)
(52) U.S. Cl. .................. 356/213; 356/218; 374/121
(58) Field of Classification Search .......... 356/213–226; 374/121
See application file for complete search history.

(56) References Cited

U.S. PATENT DOCUMENTS

| | | | | |
|---|---|---|---|---|
| 4,320,289 A | * | 3/1982 | White et al. | 250/214 R |
| 4,495,416 A | * | 1/1985 | Mason et al. | 250/338.1 |
| 4,842,404 A | * | 6/1989 | Duda | 356/218 |
| 2005/0201444 A1 | * | 9/2005 | Hollander et al. | 374/121 |

* cited by examiner

*Primary Examiner* — Hoa Q Pham
(74) *Attorney, Agent, or Firm* — Blakely, Sokoloff, Taylor & Zafman LLP

(57) ABSTRACT

A radiometer the calibration of collimated pulsed laser sources. In one embodiment the laser sources have wavelengths of 1064 nm and 1540-1570 nm wavelengths at irradiance levels of $7 \times 10^{-5}$ to $5 \times 10^{10}$ Watts/cm$^2$, with pulse widths of 5-400 ns. A lens system used to focus beams from the laser sources includes two piano convex lenses and one aspheric lens, all with 1.5 micron and 1.06 micron anti-reflection coatings. An InGaAs avalanche photodiode (APD) detector and a linear amplifier generate an output voltage which represents the pulse and power of the input laser. The output voltage is captured on a fast oscilloscope and converted to irradiance through NIST calibration factors. The detector is kept at a constant predetermined temperature with a heater ring and feedback circuit. The detector is mounted on a translation stage for placing the detector at the proper position for the 1064 nm and 1540-1570 nm wavelengths.

10 Claims, 6 Drawing Sheets

RADIOMETER FOR DETECTING AND MEASURING LOW LEVELS OF PULSED LASER SOURCES

FIELD OF THE INVENTION

A dual wavelength extended sensitivity radiometer (D-ESR) that detects and measures low levels of pulsed laser sources.

BACKGROUND OF THE INVENTION

Radiometers of the type disclosed herein are used to measure and calibrate electro-optic test sets that generate low levels of laser energy in the 1064 nm and 1540-1570 nm wavelengths. In the prior art, electro-optic test sets only required calibration at a wavelength of 1064 nm. A radiometer known as the APD800, developed through the NAVSEA R&D program, fulfilled this requirement. New "eyesafe" (1540-1570 nm) wavelengths have been added to test sets for support of new military rangefinders. The APD800 cannot detect this new wavelength range.

Another radiometer, namely the PLR-100 radiometer, also developed through the NAVSEA R&D program, is limited in that it is too slow to accurately catch fast laser pulses and it is not sensitive enough to measure the full range of test sets output. There is no commercially available instrument that can measure signals used for calibrating the test sets that test minimum sensitivity of laser rangefinders and designators.

The only instrument that is similar is a peak power measurement system manufactured by Delta Developments known as the Peak Power Measurement Head model HL. However, it can only be used at a single predetermined wavelength and can only measure signals down to 2 $\mu W/cm^2$. By way of contrast, the invented D-ESR is capable of measurements down to 0.5 $nW/cm^2$. The speed of the Delta Developments unit is 10 ns FWHM (full width half maximum) compared with 2.3 ns for the invented D-ESR. The invented D-ESR radiometer may have potential use in support of LIDAR (light detection and ranging) as well as its intended use in the support of laser rangefinders and designators.

BRIEF SUMMARY OF THE INVENTION

The invented D-ESR radiometer is used for the calibration of collimated pulsed laser sources of 1064 nm and 1540-1570 nm wavelengths at irradiance levels of $7\times10^{-5}$ to $5\times10^{-10}$ Watts/$cm^2$, with pulse widths of 5-400 ns. For example, the invented D-ESR can measure irradiance down to $5\times10^{-10}$ Watts/$cm^2$ on a 125 $cm^2$ beam and pulses as fast as 5 ns. It operates at wavelengths of 1064 nm and 1540-1570 nm. Its field of view is 2 milliradians which is expandable to 10 milliradians for alignment purposes. The output of the radiometer is a 50 ohm voltage which represents the pulse and power of the input laser. It is captured on a fast oscilloscope and converted to irradiance through NIST calibration factors.

The essential elements of the system are a InGaAs avalanche photodiode (APD) detector such as part no. C30659E available from PerkinElmer, a linear amplifier, and dual anti-reflective (AR) coated optics lens system. The detector is kept at a constant predetermined temperature with a heater ring and feedback circuit.

The lens system includes two piano convex lenses and one aspheric lens all with 1.5 micron and 1.06 micron anti-reflection coatings.

The detector is mounted on a translation stage which is controlled by a circuit board with a preprogrammed chip for placing the detector at the proper position for the 1064 nm and 1550 nm wavelengths selectable by, for example, a push button switch on a back panel. The 1550 nm wavelength position is used to test for lasers utilizing the 1540 nm-1570 nm wavelengths. A display alerts the operator when the translation stage is selectable as to the wavelength and position. The power supply for this translation stage controller is only activated when needed in order to be able to use the same supply for amplifier switches. The amplifier switches route the signal through or bypass a linear video amplifier used to improve the detection of very low energy level signals. This also reduces the amount of heat in the system which would be created from the translation controller. The signal path is routed though shielded and insulated microwave semi-rigid cables and coaxial switches.

In another embodiment, an alternative to the automatic positioning of the detector is to select the positions using external manual or external computer controlled translation controllers.

DETAILED DESCRIPTION OF THE INVENTION

Figure 1:
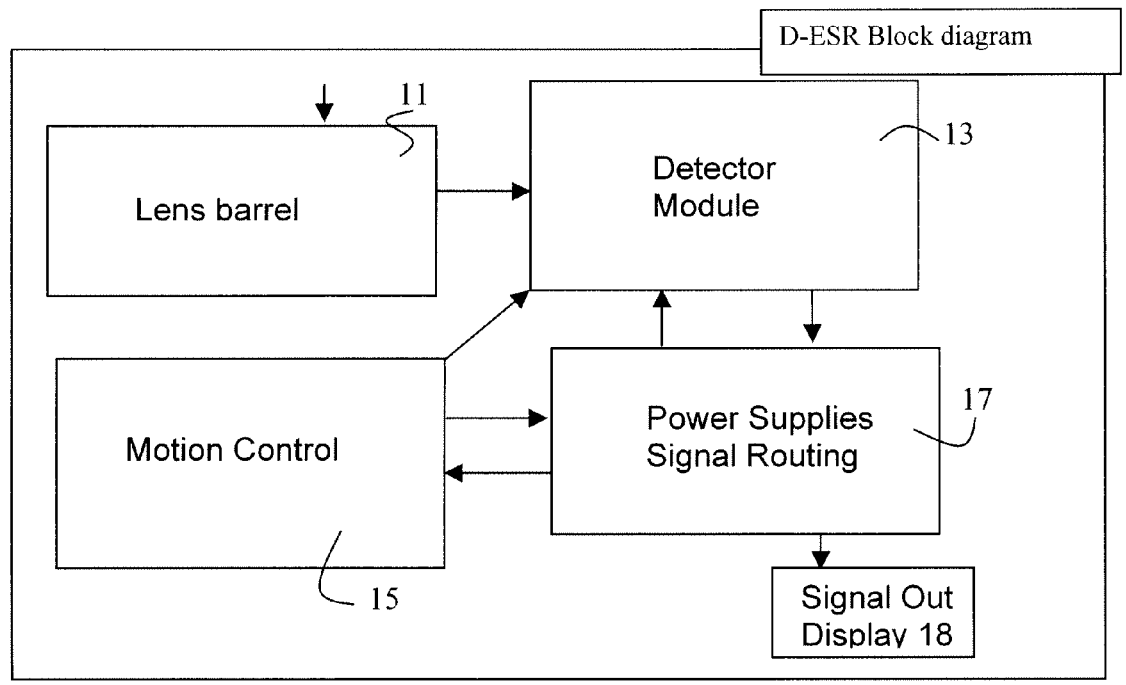
FIG. 1 is an overall block diagram of the invented system.
Figure 7:
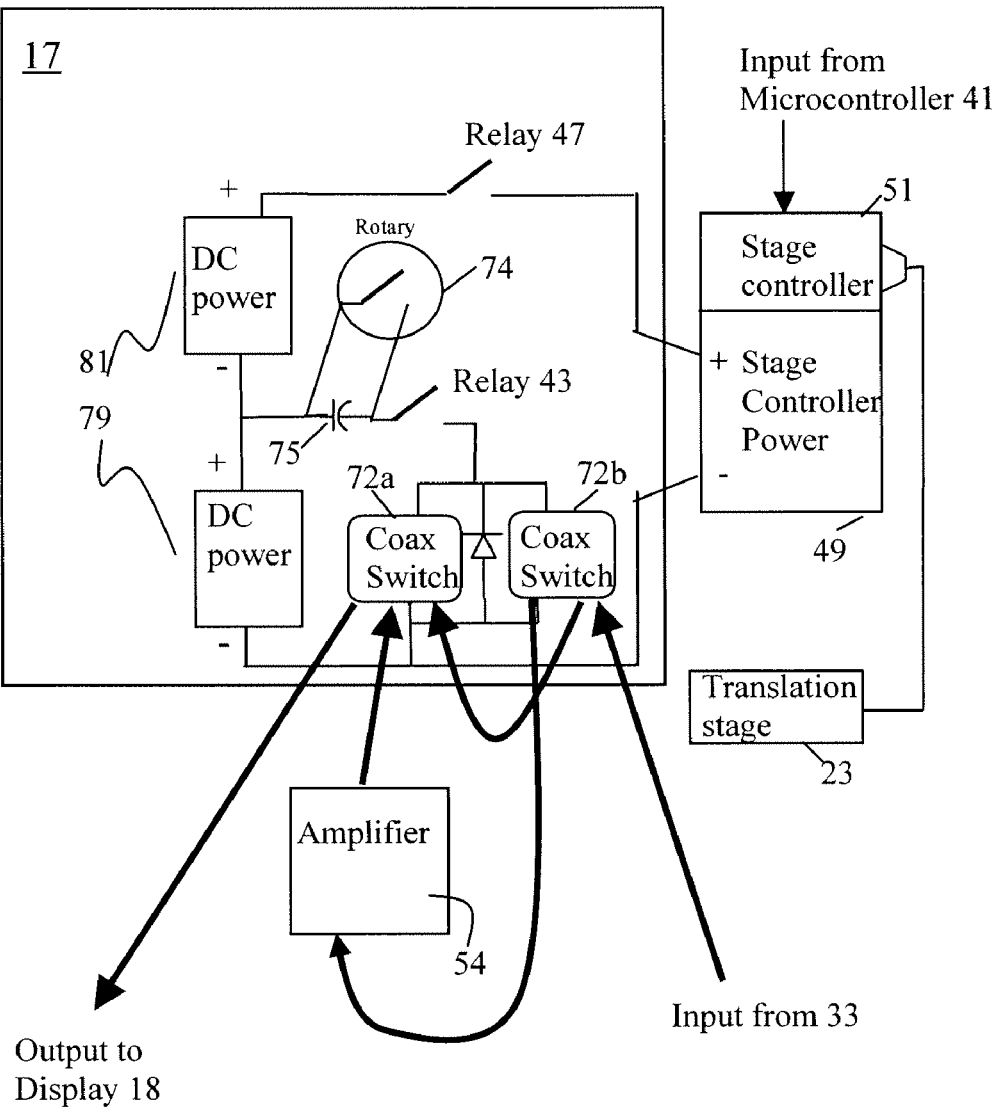
FIG. 7 is a block diagram showing power supplies/signal routing 17 shown in FIG. 1.

Referring to FIG. 1, the invention includes a lens barrel 11 having two plano convex lenses in front of one aspheric lens (see FIG. 2) which are all dual AR coated for 1064 nm and 1550 nm wavelengths, The 1550 nm coating is used because it works for the 1540 nm to 1570 nm wavelength range. A detector module 13 includes an InGaAs avalanche photodiode detector 31 and other elements for placing the detector at the proper position based on the wavelength of the laser under test as described in more detail with reference to FIG. 3. A motion control module 15 works in conjunction with detector module 13 as described below with reference to FIG. 4 to ensure proper positioning of the detector. Power supplies and signal routing 17 as described below with reference to FIG. 7 provide power and control signals to detector module 13, motion control 15 and display 18 which utilizes an oscilloscope.

Figure 2:
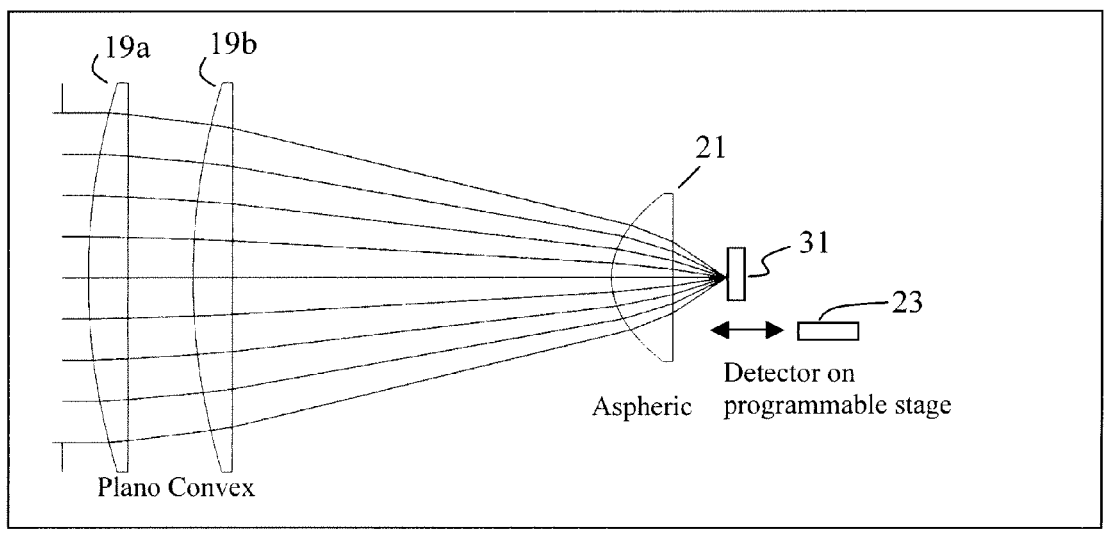
FIG. 2 is a block diagram showing the orientation of the three lenses and detector utilized by the invented system.

FIG. 2 shows the orientation of the three lenses inside lens barrel 11, i.e., piano convex lenses 19a and 19b in front of aspheric lens 21. Also included in lens barrel 11 is the detector module 13 and detector 31 which is located on a movable, programmable stage 23. The lenses are spaced at distances which minimize the spot size of the laser beam (less than 200 micron from a large, e.g., over 5 inch, collimated laser beam of wavelength 1064 nm or 1550 nm at two points in space behind the aspheric lens, the first point for the 1064 nm beam and the second for the 1540 to 1570 nm beams.

Figure 3:
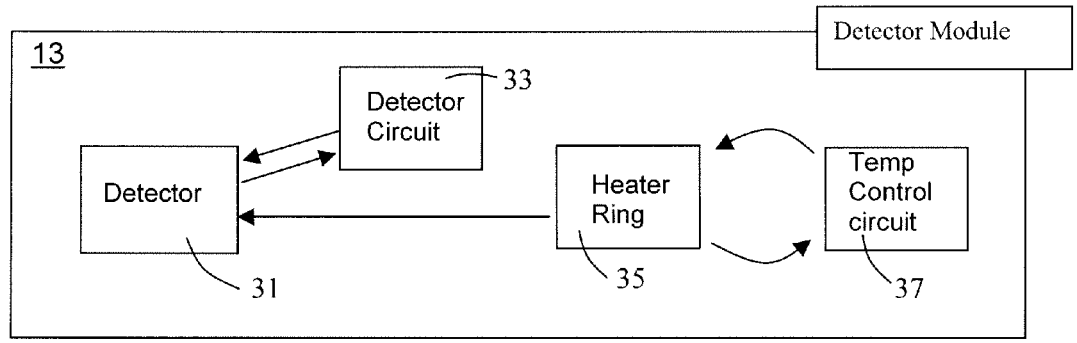
FIG. 3 is a block diagram of the detector module 13 shown in FIG. 1.

Referring now to FIG. 3, detector module 13 includes an InGaAs avalanche photodiode (APD) detector 31, detector circuit 33 and a heater ring 35 set to a temperature between 30 and 40 degrees Celsius with feedback thermistors controlled by temperature control circuit 37. The APD detector is positioned by the motion control module 15 described below with reference to FIG. 4. Detector 31 is fast enough to capture a 5 ns pulse and sensitive enough to detect a laser having $10^{-10}$ Watts of power and wavelengths of 1540 nm-1570 nm and 1064 nm. The detector is controlled with heater ring 35 set to 35 degrees Celsius to keep it at a constant sensitivity for use as a calibration standard. The detector module is positioned to the focal points of interest, i.e., for 1064 nm and 1540 to 1570 nm wavelength beams, by motion control module 15 which operates to move programmable stage 23 as shown in FIG. 2.

In one embodiment, detector 31 is a InGaAs APD such as part no. C30659E available from PerkinElmer which has a spectral responsivity of 950 nm to 1700 nm. By making suitable changes to the lens system and motion control module for use with other focal points, the invented system can be adapted for use with lasers having wavelengths other than 1540 nm-1570 nm and 1064 nm which are included in the 950 nm to 1700 nm spectral responsivity range. Further, by using an APD having different spectral responsivity, the invented system could be adapted to detect and measure pulsed laser sources outside the 950 nm to 1700 nm wavelength range. The changes needed to adapt the system for such other ranges would be well within the skills of persons skilled in the art.

Figure 4:
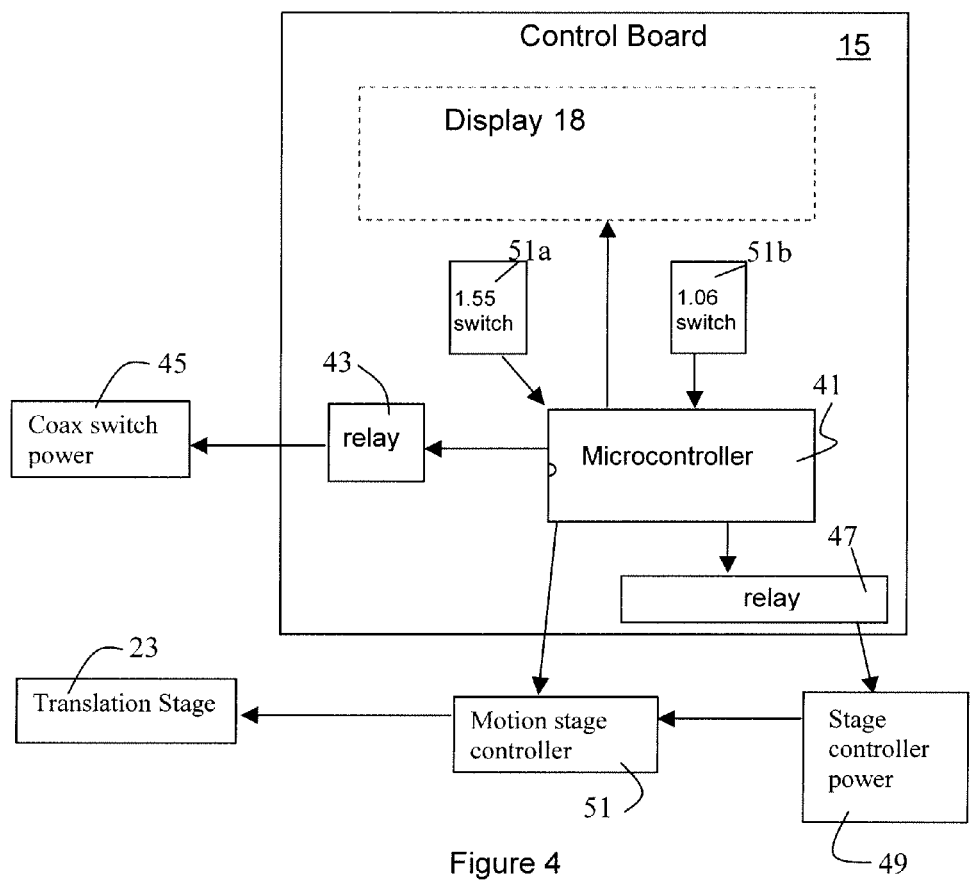
FIG. 4 is a block diagram of the motion control module 15 shown in FIG. 1.

Referring to FIG. 4, motion control module 15 includes a microcontroller 41, relay 43 which controls coax power switch 45, and relay 47 which provides power to stage controller power 49. Motion stage controller 51 controls the positioning of translation stage 23 on which detector 31 is mounted with detector circuit 33 and heater ring 35. Also shown in FIG. 4 are selector switches 51a and 51b which select the 1540-1570 nm or 1064 nm wavelength positions, respectively. Microcontroller 41 operates in accordance with the flowchart/state machine shown in FIG. 9.

Coax power switch 45 operates as follows. Power from relay 43 turns on two coax switches 72a and 72b which then reroute the signal from detector circuit 33 to pass though the amplifier 54 as shown in FIG. 7. The amplified signal then goes back though the switches and out to the display 18, i.e., an oscilloscope.

Motion stage controller 51 receives input from microcontroller 41 and based on the input will power on or off and home translation stage 23 or move it to the proper location at the proper speed and send back position information to microcontroller 41. The stage controller power 49 is controlled by relays 43 and 47 which allow the sharing of limited power resources as described below with reference to FIG. 7. Stage controller power 49 and motion stage controller 51 may be implemented by a single axis motion controller such as a Newport SMC100CC connectable to a compatible translation stage 23.

Figure 5:
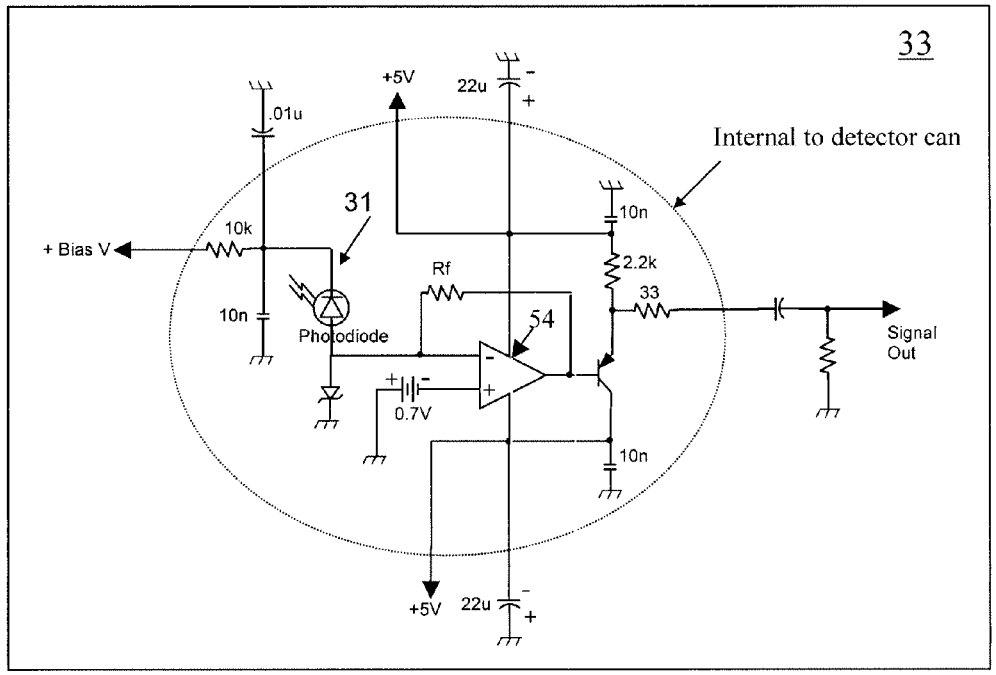
FIG. 5 is a circuit diagram of detector circuit 33 shown in FIG. 3.
Figure 6:
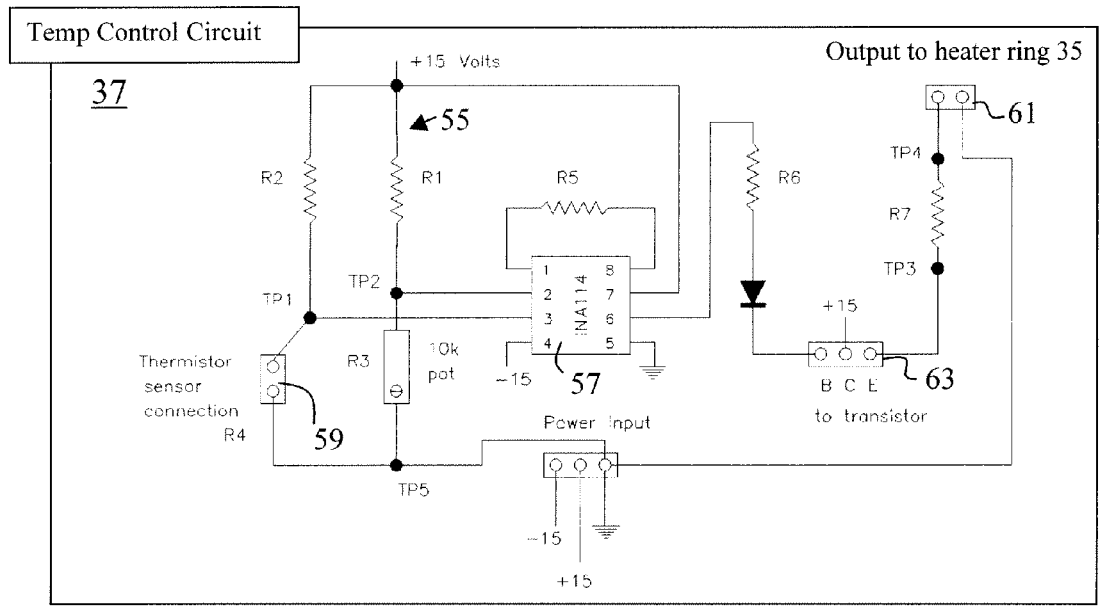
FIG. 6 is a circuit diagram of temperature control circuit 37 shown in FIG. 3.

The details of detector circuit 33 will now be described with reference to FIG. 5. APD detector 31 receives a laser beam which is focused on it by aspheric lens 21 (see FIG. 2). A bias voltage is applied to APD detector 31 to expand the linear operating range and increase the bandwidth by lowering the detector capacitance. The transimpedance linear amplifier 54 converts the photodiode current to a voltage for the signal output to display 18. Linear amplifier 54 is a 20 dB linear amplifier for improving the detection of very low energy levels, e.g., 50 nW-900 nW. A suitable linear amplifier for this purpose is available from Alliance Electronics DMP100-SMA Temperature control circuit 37 as shown in FIG. 6 includes a bridge sensor 55 and instrumentation amplifier 57 such as part no INA 114 available from Texas Instruments. The bridge sensor is made of resistors R1, R2, potentiometer R3, and a temperature sensing thermistor (not shown) connected to connector 59. Potentiometer R3 serves to determine the temperature set value when adjusted to a resistance equivalent to the desired temperature. The bridge "balances" or nulls when the temperature of the thermister creates a resistance equal to the potentiometer set value. Resistor R5, the gain resistor for the instrumentation amplifier, provides stable temperature control of the APD detector module. Connector 63 is connected to a transistor (not shown) and operates to control the current flow to the resistance heater ring 35. The transistor is controlled by the instrumentation amplifier 57. An equilibrium is reached between heat flow into the detector module from the heater ring connected to connector 61, and heat loss due to conduction and convection within five minutes of turning the power on. All the electronics stabilize sufficiently within 30 minutes to use the radiometer for accurate traceable measurements to NIST (National Institute of Standards and Technology).

FIG. 7 illustrates power supplies 79 and 81 for the signal routing 17. The stage controller power 49 is controlled by relays 43 and 47. Relay 47 is normally closed and is only opened for the brief periods required by the translation stage. This allows the sharing of limited power resources with the coax switches 72a and 72b. Rotary switch 74, which is located external to the radiometer, and capacitor 75 are used to manually select the operation of amplifier 54. The capacitor keeps any spike generated by operation of switches 72a and 72b from resetting the microcontroller 41.

Figure 8:
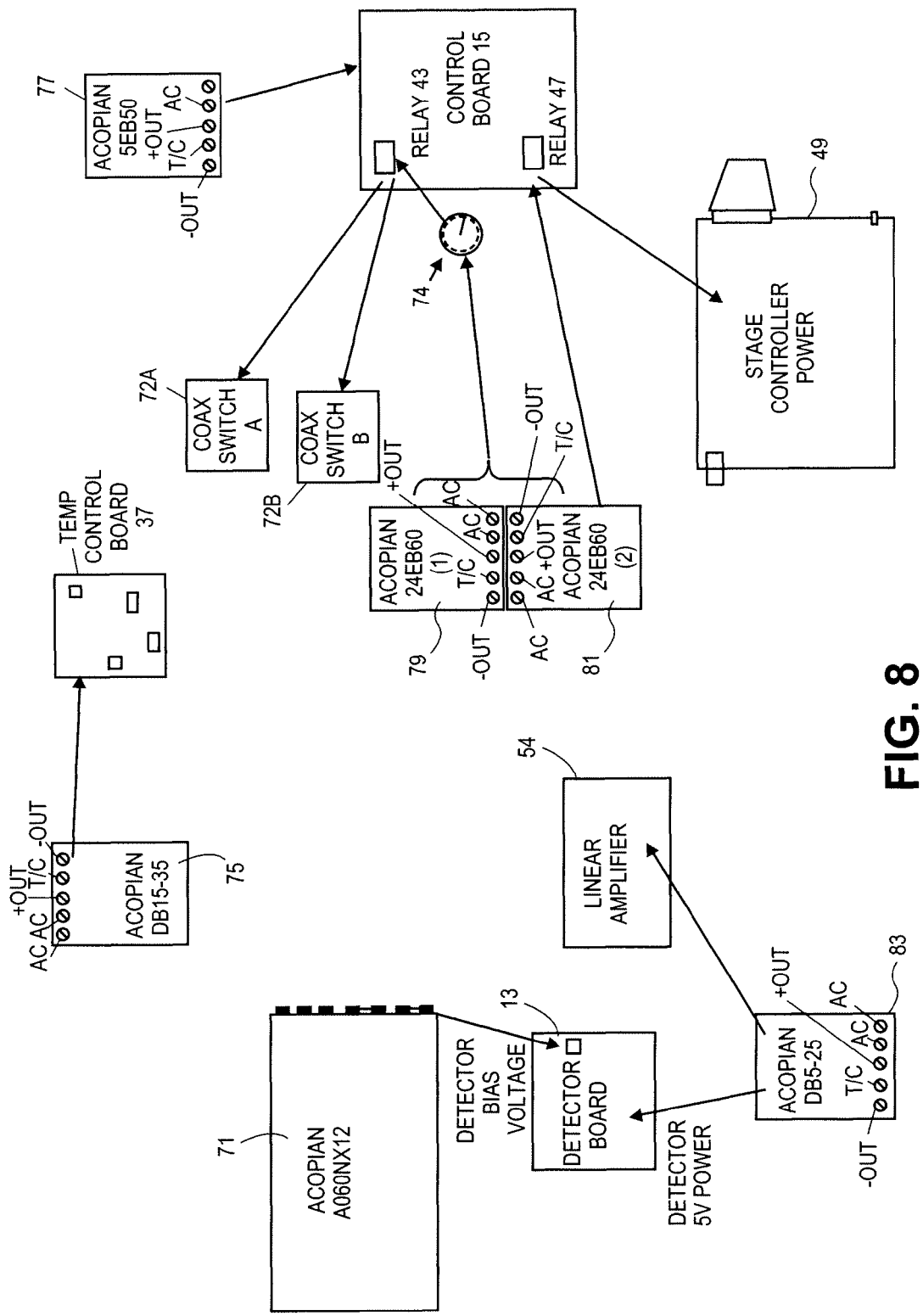
FIG. 8 is a block diagram showing all of the power supplies utilized by the invented system.

FIG. 8 shows all the power provided for the invented D-ESR starting with power supply 77 which is 5V 500 mA such as Acopian 5EB50 for control board 15. Power supply 75 is a 15Vdc, 350 mA such as Acopian DB15-35 for temperature control circuit 37. Power supply 71 is a 0-60 DC voltage to provide the adjustable bias voltage to detector 31 on detector board 37 such as Acopian A060NX12. Individual detectors require different voltage requirements unique to that detector. Power supply 79 and power supply 81 are +24Vdc, 600 mA power supplies such as Acopian 24EB60 provide 24 volts for the coax switches 72a and 72b, and operate in parallel to provide 48 volts for stage controller 49 via relay 47. Power supply 83 is a 5Vdc, 250 mA power supply such as Acopian DB5-25 for linear amplifier 54 and detector board 13.

Figure 9:
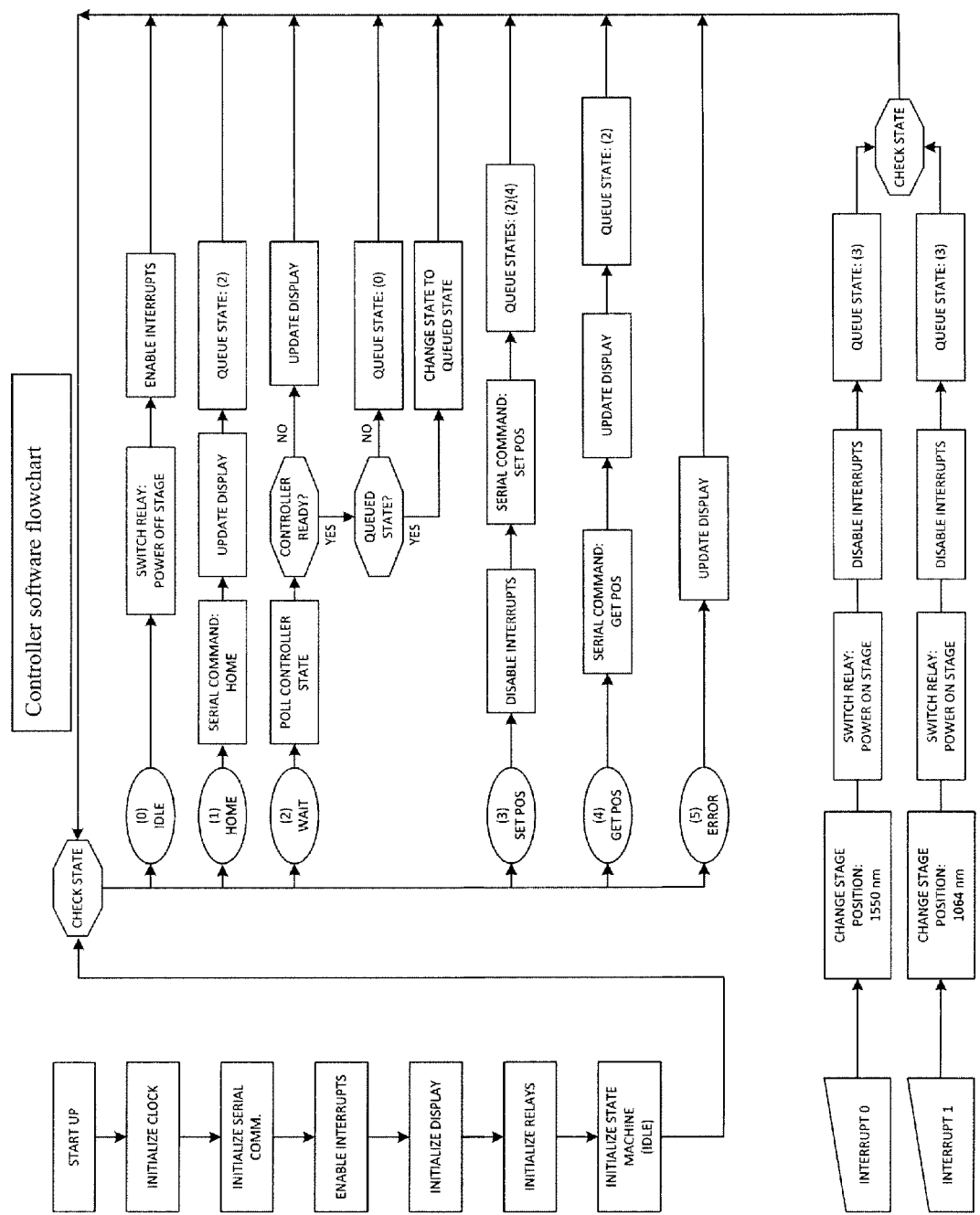
FIG. 9 is a flow chart/state machine diagram showing the operation of microcontroller 41 shown in FIG. 4.

FIG. 9 illustrates the programming flow for microcontroller 41. For the most part, the specifics of such programming are not important to an understanding of the invention, and, in any event, could be easily implemented by a person having ordinary skill in the art utilizing the foregoing description. However, it is important that the processor speed is adjusted to match the speed of the controller, as well as interface with the display. The velocity and acceleration of the stage must be preset to levels to keep the stage from overshoot which would result in damage to the optics and detector board.

We claim:

1. A radiometer for calibrating collimated pulsed laser sources comprising:
   a) a lens barrel configured to receive a laser beam having a pulse and power generated by a collimated pulse laser;
   b) said lens barrel including first and second piano convex lenses disposed in front of an aspheric lens, said lenses oriented and spaced apart so as to minimize a spot size of a collimated laser beam at a selectable one of two points in space behind the aspheric lens;

c) a detector module including an avalanche photo diode which receives said laser beam after passing through said three lenses, a detector circuit and a heater ring having a temperature controlled by a temperature control circuit, said temperature control circuit for maintaining said diode at a constant sensitivity for use as a calibration standard;

d) said detector module mounted on a translation stage for positioning said avalanche photo diode at one of two predetermined positions based on a wavelength of a laser beam from a source being calibrated;

e) a signal routing module coupled to said detector circuit for receiving an output generated by said detector circuit, said output being a voltage corresponding to said pulse and power, said routing module for routing and converting said voltage for display on an oscilloscope.

2. The radiometer defined by claim 1 further comprising a motion control module for positioning said translation stage at a selected one of said two predetermined positions.

3. The radiometer defined by claim 2 wherein said signal routing module comprises a plurality of power supplies configured to provide predetermined voltages to said detector circuit, said temperature control circuit and said motion control module.

4. The radiometer defined by claim 2 wherein said motion control module comprises switches for selecting said predetermined positions, a microcontroller coupled to said switches, a motion stage controller and said translation stage, said microcontroller configured to generate signals used by said motion stage controller to position said translation stage to one of said two predetermined positions depending on a position of said switches.

5. The radiometer defined by claim 1 wherein said detector circuit includes a linear amplifier which operates to detect very low energy level signals and convert said signals to a voltage which is output to said display.

6. The radiometer defined by claim 1 wherein said temperature control circuit includes a bridge sensor and instrumentation amplifier which operate to provide a stable temperature control of the detector module.

7. The radiometer defined by claim 6 wherein said bridge sensor and instrumentation amplifier are configured so that an equilibrium is reached between heat flow into said detector module from said heater ring and heat loss from said detector module due to conduction and convection.

8. The radiometer defined by claim 1 wherein the laser sources have wavelengths of 1064 nm and 1540-1570 nm.

9. The radiometer defined by claim 1 wherein said two piano convex lenses and said aspheric lens each have 1.5 micron and 1.06 micron anti-reflection coatings.

10. The radiometer defined by claim 1 wherein a power supply for the motion stage controller is selectively activated.

* * * * *